US012305636B2

(12) United States Patent
Goy et al.

(10) Patent No.: US 12,305,636 B2
(45) Date of Patent: May 20, 2025

(54) MOTOR DRIVEN PUMP WITH PROGNOSTIC HEALTH MONITORING BASED ON MOTOR CHARACTERISTICS

(71) Applicant: Hamilton Sundstrand Corporation, Charlotte, NC (US)

(72) Inventors: Edward W. Goy, Crystal Lake, IL (US); John M. Kassel, Huntley, IL (US); Mark W. Shoemaker, Pecatonica, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/849,877

(22) Filed: Jun. 27, 2022

(65) Prior Publication Data

US 2023/0417236 A1 Dec. 28, 2023

(51) Int. Cl.
*F04B 51/00* (2006.01)
*F04B 17/03* (2006.01)
(Continued)

(52) U.S. Cl.
CPC .............. *F04B 51/00* (2013.01); *F04B 17/03* (2013.01); *F04D 15/0088* (2013.01);
(Continued)

(58) Field of Classification Search
CPC ........ F04B 17/03; F04B 49/065; F04B 51/00; F04B 2203/0201; F04B 2203/0202;
(Continued)

(56) References Cited

U.S. PATENT DOCUMENTS 9,777,723 B2 10/2017 Wiegman et al.
2010/0021313 A1* 1/2010 Devan .................. F04B 49/103 417/44.1

(Continued)

FOREIGN PATENT DOCUMENTS

DE 102018102186 A1 * 8/2018
DE 202020105300 U1 12/2021

(Continued)

OTHER PUBLICATIONS

Physics-StackExchange; Jonathan. (https://physics.stackexchange.com/users/4/jonathan) [online], Relationship between current through a motor and it's load, URL (version: Jan. 15, 2013): Retrieved from: https://physics.stackexchange.com/q/51332.*
Abstract for DE202020105300 (U1)—Dec. 21, 2021, 1 page.
European Search Report for Application No. 23176382.2, mailed Nov. 27, 2023, 9 pages.

*Primary Examiner* — Charles G Freay
(74) *Attorney, Agent, or Firm* — CANTOR COLBURN LLP

(57) ABSTRACT

A flow system includes a pump, a motor connected to the pump that drives the pump and draws electrical energy and a sensor that measures the electrical energy drawn by the motor. The system also includes a control module for the flow system. The control module configured to perform a control module method that includes: receiving electrical data from the sensor; receiving operating characteristic data of the pump from one or more pump sensors; comparing the changes in the electrical data over time to the operating characteristic data; and determining a health of the pump on the comparison of changes in the electrical data over time to operating characteristic data.

14 Claims, 2 Drawing Sheets

(51) Int. Cl.
*F04D 15/00* (2006.01)
*F04B 49/06* (2006.01)

(52) U.S. Cl.
CPC ..... *F04B 49/065* (2013.01); *F04B 2203/0201* (2013.01); *F04B 2203/0202* (2013.01); *F04B 2203/0208* (2013.01); *F04B 2205/05* (2013.01); *F04B 2205/09* (2013.01); *F04B 2207/70* (2013.01); *F05D 2260/80* (2013.01)

(58) Field of Classification Search
CPC .......... F04B 2203/0208; F04B 2205/05; F04B 2205/09; F04B 2207/70
See application file for complete search history.

(56) References Cited

U.S. PATENT DOCUMENTS

| | | | | |
|---|---|---|---|---|
| 2018/0230991 | A1* | 8/2018 | Andrich .............. | F04B 39/1073 |
| 2020/0173441 | A1 | 6/2020 | Brandolin | |
| 2021/0262899 | A1 | 8/2021 | Goy et al. | |
| 2021/0285384 | A1 | 9/2021 | Rhoden et al. | |

FOREIGN PATENT DOCUMENTS

| | | | | |
|---|---|---|---|---|
| GB | 2578106 | A | | 4/2020 |
| WO | WO 2010/144782 | | * | 12/2010 |
| WO | WO 2015/066219 | A1 | * | 5/2015 |
| WO | 2019218408 | A1 | | 11/2019 |

* cited by examiner

MOTOR DRIVEN PUMP WITH PROGNOSTIC HEALTH MONITORING BASED ON MOTOR CHARACTERISTICS

BACKGROUND

Exemplary embodiments pertain to the art of flow systems, more specifically to pump health monitoring based on characteristics of a motor driving the pump.

Pumps (e.g., centrifugal, positive displacement, etc.) degrade in their performance over time and can benefit from preventative health monitoring. Pump performance for each pump also vary based upon their initial manufacturing dimensions and other manufacturing tolerances (e.g., motor winding characteristics, surface finishes, part rigidity, etc.).

Such conventional systems have generally been considered satisfactory for their intended purpose. However, there is still a need in the art for pump health monitoring. The present disclosure provides a solution for this need.

BRIEF DESCRIPTION

Disclosed is a flow system that includes a pump, a motor connected to the pump that drives the pump and draws electrical energy and a sensor that measures the electrical energy drawn by the motor. The system also includes a control module for the flow system. The control module configured to perform a control module method that includes: receiving electrical data from the sensor; receiving operating characteristic data of the pump from one or more pump sensors; comparing the changes in the electrical data over time to the operating characteristic data; and determining a health of the pump on the comparison of changes in the electrical data over time to operating characteristic data.

In addition to one or more of the features described above, or as an alternative to any of the foregoing embodiments, determining the health includes generating an alarm if the magnitude of the electrical data increases over time as the operating characteristic data remains within operating parameter ranges.

In addition to one or more of the features described above, or as an alternative to any of the foregoing embodiments, the electrical energy measured by the sensor is a current.

In addition to one or more of the features described above, or as an alternative to any of the foregoing embodiments, the electrical energy measured by the sensor is a voltage.

In addition to one or more of the features described above, or as an alternative to any of the foregoing embodiments, the electrical energy measured by the sensor is a power.

In addition to one or more of the features described above, or as an alternative to any of the foregoing embodiments, the operating characteristic data is an output pressure of the pump.

In addition to one or more of the features described above, or as an alternative to any of the foregoing embodiments, the operating characteristic data is a flow rate of the pump.

In addition to one or more of the features described above, or as an alternative to any of the foregoing embodiments, the system can further include a pump housing that contains the pump.

In addition to one or more of the features described above, or as an alternative to any of the foregoing embodiments, the motor is within the pump housing.

Also disclosed is a non-transitory computer readable medium comprising computer executable instructions to cause a computerized device to perform a method related to a flow system. The method includes: receiving electrical data from a sensor that measures the electrical energy drawn by a motor that drives a pump; receiving operating characteristic data of the pump from one or more pump sensors; comparing the changes in the electrical data over time to the operating characteristic data; and determining a health of the pump on the comparison of changes in the electrical data over time to operating characteristic data sensing actual first pump characteristic data from a flow system using one or more sensors.

In addition to one or more of the features described above related to the non-transitory computer readable medium, or as an alternative to any of the foregoing embodiments, determining the health includes generating an alarm if the magnitude of the electrical data increases over time as the operating characteristic data remains within operating parameter ranges.

In addition to one or more of the features described above related to the non-transitory computer readable medium, or as an alternative to any of the foregoing embodiments, the electrical energy measured by the sensor is a current.

In addition to one or more of the features described above related to the non-transitory computer readable medium, or as an alternative to any of the foregoing embodiments, the electrical energy measured by the sensor is a voltage.

In addition to one or more of the features described above related to the non-transitory computer readable medium, or as an alternative to any of the foregoing embodiments, the electrical energy measured by the sensor is a power.

In addition to one or more of the features described above related to the non-transitory computer readable medium, or as an alternative to any of the foregoing embodiments, the operating characteristic data is an output pressure of the pump.

In addition to one or more of the features described above related to the non-transitory computer readable medium, or as an alternative to any of the foregoing embodiments, the operating characteristic data is a flow rate of the pump.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

There have been some attempts to monitor the heath of a pump. For example, in U.S. Patent Application Publication No. 2021/0262899 a system is disclosed that has a pump with on-board memory to store initial performance characteristics of the pump. Current operating conditions/performance characteristic of the pump are compared to the stored initial performance characteristics to allow for prognostic health management (PHM) capabilities. U.S. Patent Application Publication No. 2021/0262899 is incorporated herein by reference in its entirety.

Herein disclosed is system that allows for PHM but monitors characteristics of a device that is not part of the pump itself. For example, the performance characteristic of a motor that drives the pump could be monitored. In a non-limiting example, for a motor driven pump, an electrical parameter (e.g., current or voltage) of the motor could be monitored. This could be compared to initial data about the motor. As the pump wears, the electrical parameter could increase. For example, as a pump wears, the current/voltage draw of the motor required to meet the required pressures of the pump at specific conditions might increase. In this manner, while the pump may be performing at the desired level, the motor "work" to keep that level can be indication that the pump is wearing and is valuable information for use in PHM.

Additionally, the on-board computer (control module) could track operating time of the motor (which could be independent of airframe/engine/aircraft operating time) and can trigger indications for needed scheduled maintenance prior to loss of performance and inability to meet requirements.

Figure 1:
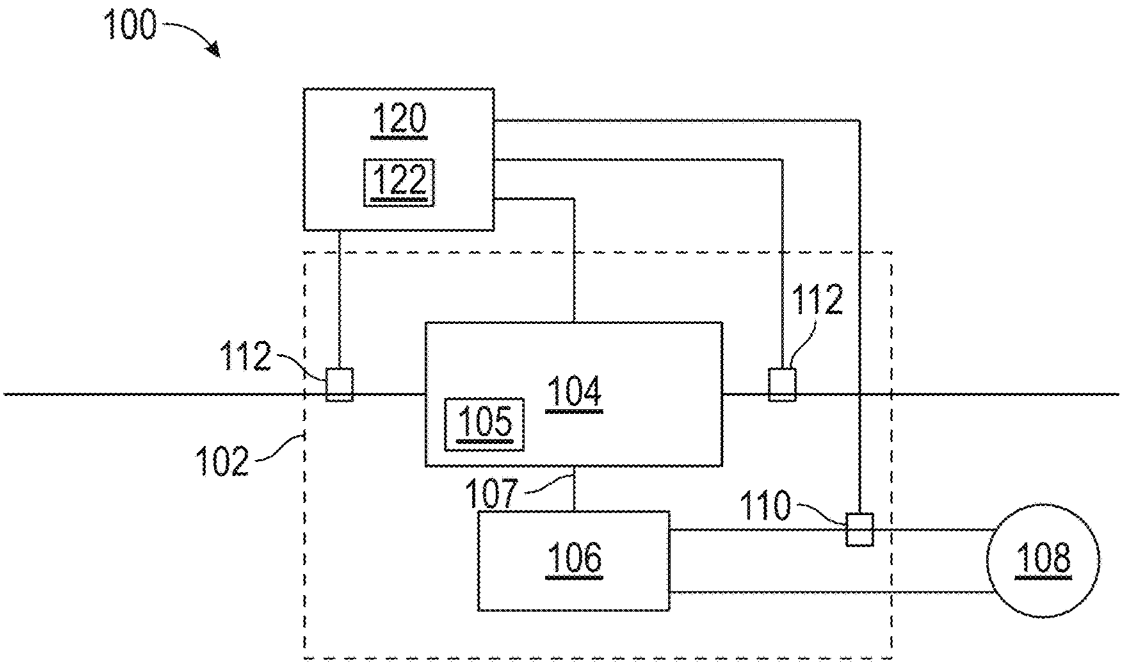
FIG. 1 is a schematic of a system according to one embodiment.

In accordance with at least one aspect of this disclosure and as illustrated in FIG. 1, a system 100 can include flow system 102. The flow system 102 includes a pump 104. The pump can be any suitable type of pump, e.g., a centrifugal pump or a positive displacement pump. The pump 104 is driven by an electric motor 106. As shown, the motor 106 provides rotational energy to the pump 104 via a shaft 107. It shall be understood that the motor 106 and the pump could be in the same housing in one embodiment but that is not required.

The motor 106 can receive/draw power (e.g., voltage/current) from a power source 108. The power source 108 can be a generator or a power bus depending on the context. The voltage/current provided to the motor 106 by the power source 108 can be measured by one or sensors 110. The one or more sensors 110 can be a power sensor, a voltage sensor or a current sensor. The voltage/current can be referred to as an electrical quantity or and may be expressed as an electrical date.

The flow system 102 can also include one or more pump sensors 112. The one or more sensors 112 can include any suitable type of analog and/or digital senor (e.g., a flow rate sensor, a pressure sensor, a temperature sensor, a current, voltage, and/or power sensor, etc.) connected to any suitable part of the system (e.g., a flow line, an electrical component of the pump).

The system also includes a control module 120. The control module 120 can be configured to perform a control module method. The control module method can include any suitable method(s) and/or portion(s) thereof as disclosed herein. The control module 120 is operatively connected to at least the motor sensor 110. The control module 106 is also operatively connected to the pump sensors 112 and possibly the pump 104.

The control module 120 can include memory 122 that stores initial data related to pump 104 and the motor 106. The data can include first pump characteristic data of the pump 104. The first pump characteristic data can be standard pump performance data detailing performance when the pump is new, for example. The data can come, for example, from a data source 105 that is at least one of a 2D barcode or a 3D barcode disposed on or formed on a surface (e.g., an outside surface, a pump face, an interior accessible surface) of the pump housing. Any other suitable data source (e.g., a digital memory) and/or type of first pump characteristic data is contemplated herein.

In accordance with certain embodiments disclosed herein, pump specific performance characteristics identified, e.g., by original equipment manufacturer (OEM) testing can be stored on a suitable data storage medium (e.g., a USB type memory device) attached to the pump, on a 3D name plate attached to the pump, or in any other suitable storage medium attached to the pump. Such characteristics can provide the control module 120 (e.g., an engine controller such as a FADEC/EEC) with pump performance data which can allow for monitoring of the pump for degradation to provide preventative health monitoring, for example. This data can be stored, for example, in the memory 122.

Characterization and storage of the specific operating characteristics on the pump and/or the engine controller can allow for preventative health monitoring of the pump and removal prior to a failure. Onboard storage or ID plate printing of performance characteristics specific to each pump can aid the electronic fuel controls or electronic engine controller to monitor the pump's performance over time and establish criteria for removal of the pump prior to its failure, for example.

The memory 122 can also store electrical data received from the sensor 112 related to an electrical parameter (e.g., power, voltage or current) drawn by the motor 106 over time. The controller 120 can be configured to perform a method based on the electrical parameter alone or in combination with "real time" or historical data created by the pump sensors 112.

The control module 120 can be a dedicated pump control module, or any other suitable module (e.g., an engine control module for controlling fuel flow with the pump). In this regard, the pump 104 can be for any suitable application (e.g., a fuel pump).

Figure 2:
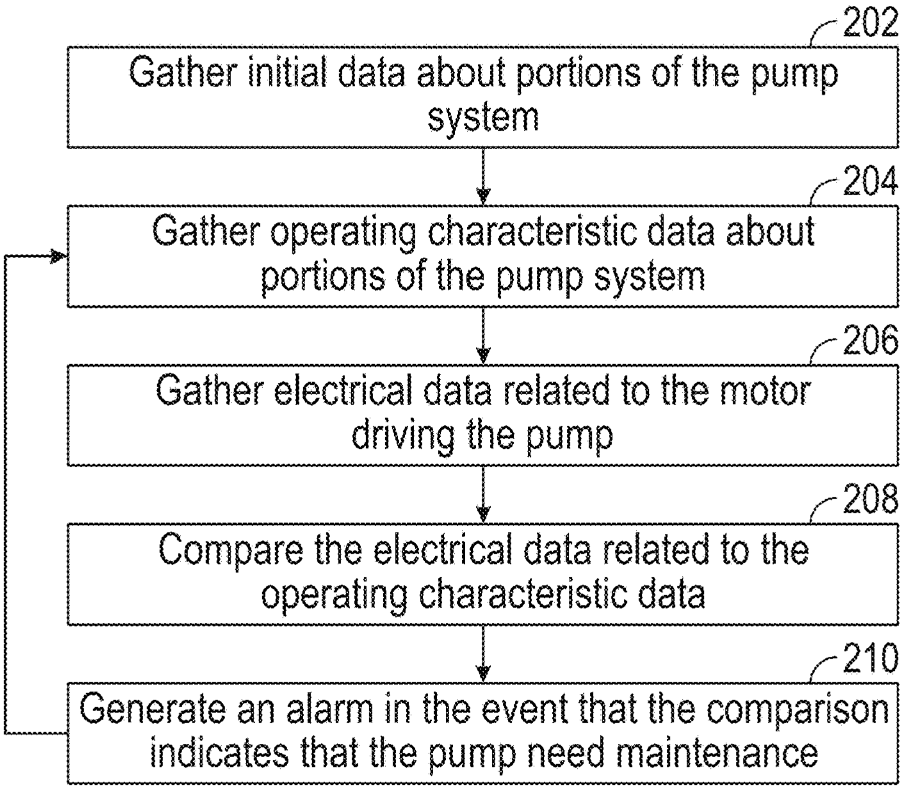
FIG. 2 is a flow chart of a method according to one embodiment.

FIG. 2 shows a method according to one embodiment. The method includes, as indicated at block 202 gathering initial data about portions of the system 100. This data can be stored, for example, in memory 122 of the controller 120. Gathering can include, for example, gathering the above mentioned first pump characteristic data from the data source 105 associated with the pump 104.

Receiving the first pump characteristic data can include receiving the first pump characteristic data at start-up and/or initialization of the control module. The method can include storing the first pump characteristic data until shut down or reset of the flow system to allow an update of the first pump characteristic data at each start-up to account for a pump change. In certain embodiments, receiving the first pump characteristic data can include receiving the first pump characteristic data only at start-up and/or initialization of the control module. It shall be understood, however, that in certain embodiments, this step can be omitted and only "live" data (second pump characteristic data discussed below) can be considered.

As indicated at block 204, the method can further include gathering second pump characteristic data from the flow system 100 using one or more pump sensors 112. The second pump characteristic can be recorded over time. For example, one of the pump sensors 112 can measure output pressure and the output pressure over time can be recorded overtime. This output pressure is part of the second pump characteristic data. The pump sensor 112 can also measure other values such as flow rate. The second pump characteristic data may also be referred to as operating characteristic data herein and can include any data gathered by pump sensors 112. In one embodiment, PHM can be performed based on comparing the first pump characteristic data to the second pump characteristic data sensed in the flow system 100.

As indicated at block 206, the method can further include gathering and storing electrical data received from the sensor 110 related to an electrical parameter (e.g., power, voltage or current) drawn by the motor 106 over time. Stated differently, the motor can draw electrical energy that can be measured by the sensor 110.

As indicated at block 208, the method can further include comparing the second pump characteristic data with the electrical data received from the sensor 112. An example is informative in this regard. Consider the case where the output pressure is constant over time. This output pressure is part of the second pump characteristic data and may also be referred to as operating characteristic data herein. However, in order to achieve this same output pressure, the amount magnitude of the electrical parameter drawn by the motor 106 increases over time. This can indicate that the pump is wearing and needs maintenance. In this manner, while the operating characteristic data may indicate that the pump is working properly, utilizing data from "outside" the pump can give a more complete picture. To this end, the method can include generating an alarm in the event that the comparison indicates that the pump need maintenance as indicated at block 210. It should be noted the pressure (i.e., operating characteristic) need not remain exactly constant as long as it is within a range of acceptable operating conditions. Thus, the method as indicated at block 208 can include generating an alarm if the magnitude of the electrical data increases over time as the operating characteristic data remains within operating parameter ranges.

Figure 3:
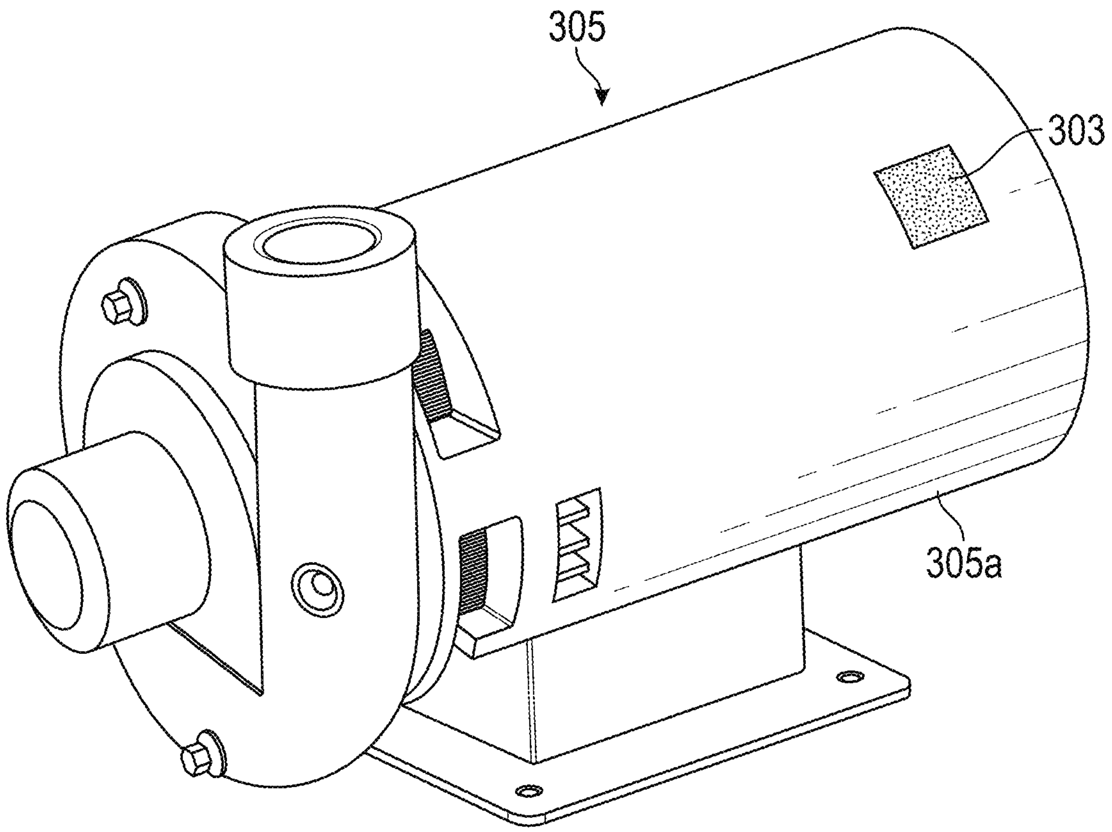
FIG. 3 is a perspective view of an embodiment of a pump in accordance with this disclosure

FIG. 3 shows an example, of a pump 305 that can be the same as pump 104 above. The pump can include a pump housing 305*a* containing one or more pump components (not shown; e.g., a centrifugal impeller or positive displacement pump such as a gear pump, a motor, etc.) and a data source 303 mounted on or in the pump housing 305. The pump 305 can be any suitable type of pump, e.g., a centrifugal pump or a positive displacement pump that can be driven by an electric motor.

The term "about" is intended to include the degree of error associated with measurement of the particular quantity based upon the equipment available at the time of filing the application.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof are contemplated herein as appreciated by those having ordinary skill in the art in view of this disclosure.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flow system, comprising:

a pump that includes specific static original performance characteristics;

a motor connected to the pump that drives the pump and draws electrical energy;

a sensor that measures the electrical energy drawn by the motor; and a control module for the flow system, the control module configured to perform a control module method, the control module method comprising:

receiving electrical data from the sensor, wherein the electrical data is related to the electrical energy drawn by the motor;

receiving operating characteristic data of the pump from one or more pump sensors;

determining that the electrical data indicates an increase in energy drawn by the motor while the operating characteristic data of the pump remains within an operating range that is related to the static original performance characteristics; and generating an alarm when the electrical data indicates the increase in energy drawn by the motor while the operating characteristic data of the pump remains within the operating range.

2. The system of claim 1, wherein the electrical energy measured by the sensor is a current.

3. The system of claim 1, wherein the electrical energy measured by the sensor is a voltage.

4. The system of claim 1, wherein the electrical energy measured by the sensor is a power.

5. The system of claim 1, wherein the operating characteristic data is an output pressure of the pump.

6. The system of claim 1, wherein the operating characteristic data is a flow rate of the pump.

7. The system of claim 1, further comprising a pump housing that contains the pump.

8. The system of claim 7, wherein the motor is within the pump housing.

9. A non-transitory computer readable medium comprising computer executable instructions to cause a computerized device to perform a method related to a flow system, the method comprising:

receiving electrical data from a sensor that measures the electrical energy drawn by a motor that drives a pump, wherein the pump includes specific static original performance characteristics;

receiving operating characteristic data of the pump from one or more pump sensors;

determining that the electrical data indicates an increase in energy drawn by the motor while the operating characteristic data of the pump remains within an operating range that is related to the specific original static original performance characteristics;

and generating an alarm when the electrical data indicates the increase in energy drawn by the motor while the operating characteristic data of the pump remains within the operating range.

10. The non-transitory computer readable medium of claim 9, wherein the electrical energy measured by the sensor is a current.

11. The non-transitory computer readable medium of claim 9, wherein the electrical energy measured by the sensor is a voltage.

12. The non-transitory computer readable medium of claim 9, wherein the electrical energy measured by the sensor is a power.

13. The non-transitory computer readable medium of claim 9, wherein the operating characteristic data is an output pressure of the pump.

14. The non-transitory computer readable medium of claim 9, wherein the operating characteristic data is a flow rate of the pump.

* * * * *